(12) United States Patent
Chang et al.

(10) Patent No.: US 11,061,170 B2
(45) Date of Patent: Jul. 13, 2021

(54) BROADBAND OBJECTIVE LENS WITH ANTI-REFLECTIVE NANOPARTICLES AND MANUFACTURING METHOD THEREOF

(71) Applicant: Korea Basic Science Institute, Daejeon (KR)

(72) Inventors: Ki Soo Chang, Daejeon (KR); Kye Sung Lee, Daejeon (KR); Dong Uk Kim, Daejeon (KR); Jung Dae Kim, Daejeon (KR)

(73) Assignee: Korea Basic Science Institute, Daejeon (KR)

( * ) Notice: Subject to any disclaimer, the term of this patent is extended or adjusted under 35 U.S.C. 154(b) by 265 days.

(21) Appl. No.: 16/164,925

(22) Filed: Oct. 19, 2018

(65) Prior Publication Data

US 2019/0121001 A1   Apr. 25, 2019

(30) Foreign Application Priority Data

Oct. 25, 2017   (KR) .................. 10-2017-0139482

(51) Int. Cl.
*G02B 1/113* (2015.01)
*G02B 1/118* (2015.01)
*G02B 21/02* (2006.01)

(52) U.S. Cl.
CPC .............. *G02B 1/113* (2013.01); *G02B 1/118* (2013.01); *G02B 21/02* (2013.01); *G02B 2207/101* (2013.01)

(58) Field of Classification Search
None
See application file for complete search history.

(56) References Cited

U.S. PATENT DOCUMENTS

| | | | | |
|---|---|---|---|---|
| 2004/0247010 A1* | 12/2004 | Okada | .................. | G02B 5/1866 372/102 |
| 2006/0199040 A1* | 9/2006 | Yamada | .................... | G02B 1/02 428/701 |
| 2007/0235342 A1* | 10/2007 | Matsuo | .................. | B82Y 30/00 205/175 |
| 2009/0143560 A1* | 6/2009 | Hatanaka | ........... | G02B 27/4211 528/196 |
| 2010/0110552 A1* | 5/2010 | Nakazawa | ............... | G02B 1/11 359/601 |
| 2010/0128350 A1* | 5/2010 | Findlay | ............. | H01L 27/14629 359/601 |
| 2012/0176668 A1* | 7/2012 | Saito | ........................ | G02B 9/34 359/357 |
| 2014/0098422 A1* | 4/2014 | Fukuda | ............ | B29D 11/00346 359/601 |
| 2015/0103226 A1* | 4/2015 | Takahashi | .............. | G02B 1/118 348/335 |

(Continued)

FOREIGN PATENT DOCUMENTS

JP   2009162965 A   7/2009
KR   10-2013-0057954   6/2013

(Continued)

*Primary Examiner* — Derek S. Chapel
(74) *Attorney, Agent, or Firm* — Christensen, Fonder, Dardi & Herbert PLLC; John Fonder

(57) ABSTRACT

Disclosed is a broadband objective lens and a method of manufacturing the objective lens. The objective lens includes a plurality of lenses, and each of the lenses includes a coating layer on which a nanopattern is formed.

7 Claims, 14 Drawing Sheets

(56) References Cited

U.S. PATENT DOCUMENTS

2017/0097497 A1* 4/2017 Cheng .................. G02B 13/003
2017/0097499 A1* 4/2017 Cheng ...................... G02B 9/12

FOREIGN PATENT DOCUMENTS

| | | |
|---|---|---|
| KR | 1020130068549 A | 6/2013 |
| KR | 10-2014-0060413 | 5/2014 |
| KR | 1020140122336 A | 10/2014 |
| KR | 10-1534992 | 7/2015 |
| KR | 10-1586073 | 1/2016 |
| WO | 2017015801 | 2/2017 |

* cited by examiner

BROADBAND OBJECTIVE LENS WITH ANTI-REFLECTIVE NANOPARTICLES AND MANUFACTURING METHOD THEREOF

CROSS-REFERENCE TO RELATED APPLICATION(S)

This application claims the priority benefit of Korean Patent Application No. 10-2017-0139482 filed on Oct. 25, 2017, in the Korean Intellectual Property Office, the disclosure of which is incorporated herein by reference for all purposes.

BACKGROUND

1. Field

One or more example embodiments relate to a broadband objective lens including an anti-reflective nanopattern and a method of manufacturing the objective lens, and more particularly, to a broadband objective lens for high-resolution and high-sensitivity imaging and a method of manufacturing the objective lens.

2. Description of Related Art

In a recent attempt to develop nano-biotechnology and optical microscopy for medical purpose, there is a growing need to simultaneously obtain anatomical structure images and functional molecular images of tissues and cells to simultaneously observe forms of biological tissues, cellular structures, metabolic activities, responses to externally administered drugs, and the like. Thus, a multimodal and multifunctional optical microscope system in which two or more independent optical imaging techniques are integrated or combined is under development to simultaneously obtain structural, functional, and molecular images.

A multimodal optical microscope is an optical microscope system in which various imaging modes are integrated to enable structural, functional, and molecular imaging of biological samples in a single microscope system.

The multimodal optical microscope is configured to use light of different wavelengths for the various imaging modes to allow light sources of different wavelengths, for example, visible rays to near-infrared rays, to be incident on a sample though an objective lens and receive optical signals of various wavelengths from the sample through the objective lens, and thus needs a broadband objective lens configured to enable high-resolution and high-sensitivity imaging in a broad wavelength band.

In general, a wavelength band of an objective lens is determined by an anti-reflective wavelength band that may be obtained through anti-reflective thin film coating technology. However, in principle, the anti-reflective thin film coating technology may not be readily embodied in a broad wavelength band. The anti-reflective thin film coating technology is applied to current objective lenses that are commercially used. Such objective lenses have a narrow wavelength band and may thus not be readily used as an objective lens of an optical microscope requiring high-resolution imaging in a broad wavelength band, compared to a multimodal optical microscope.

Thus, to overcome such disadvantages of the existing anti-reflective thin film coating technology, broadband anti-reflective nanostructure technology having an anti-reflective property has been developed. The broadband anti-reflective nanostructure technology forms, on a surface of an objective lens, a lattice structure having a pitch or period that is shorter than or equal to an optical wavelength to gradually change an effective refractive index on an interface between air and the lens from a refractive index of air, for example, approximately 1.0, to a refractive index of a lens material in order to minimize reflection that may occur on the interface between air and the lens.

A general type of objective lens may include a combination of multiple lenses of different materials. However, not all manufacturers of the lenses open information on their lens materials, and thus it may not be easy to optimize a processing condition for each lens and the lenses may require different processing conditions. In addition, optical glass used for lenses may include an element and/or a compound that does not produce a response at an etching chamber to form a volatile fluoride compound, and thus it may be more difficult to perform etching based on a plasma process than fused silica and glass, for example, Pyrex. Such an etching process for optical glass may be more similar to a mechanical sputtering process and require a high bias voltage for etching. Thus, such an aggressive process may degrade an etching mask, thereby degrading a process selectivity.

Thus, there is a desire for a method of optimizing a processing condition for each of lenses used for an objective lens.

SUMMARY

An aspect provides a broadband objective lens for high-resolution and high-sensitivity imaging and a method of manufacturing the objective lens by optimizing a lens processing condition.

However, tasks to be solved by example embodiments provided herein may not be limited to the foregoing, and thus other tasks that are not described herein may also be solved by the following example embodiments described herein.

According to an aspect, there is provided a broadband objective lens including a plurality of lenses each including a coating layer on which a nanopattern is formed.

The coating layer may be an anti-reflective coating layer.

The nanopattern may include an arrangement in which at least one of cylinder, triangular pyramid, or parabolic cylinder is repeated.

Each of a height and a pitch of the nanopattern may be 100 nanometers (nm) to 600 nm.

The nanopattern may include a honeycomb structure.

The coating layer may include at least one selected from a group consisting of silicon oxide, titanium oxide, aluminium oxide, tantalum oxide, silicon nitride, and magnesium fluoride.

The coating layer may have a refractive index of 1.4 to 1.9.

The coating layer may have a refractive index that is ±10% of a refractive index of each of the lenses.

The coating layer may be an anti-reflective coating layer.

The broadband objective lens may have an average transmittance of 70% or greater in a wavelength range of 450 nm to 1600 nm, an average transmittance of 80% or greater in a wavelength range of 450 nm to 1000 nm, and an average transmittance of 60% or greater in a wavelength range of 1000 nm to 1600 nm.

According to another aspect, there is provided a method of manufacturing a broadband objective lens, the method including forming a coating layer on a surface of each of a plurality of lenses through a single process, and forming a nanopattern on the coating layer.

The forming of the nanopattern on the coating layer may include forming a nanoparticle on the coating layer, etching the coating layer on which the nanoparticle is formed, and removing the nanoparticle formed on the coating layer. A size of the nanoparticle may be 30 nm to 300 nm.

The forming of the coating layer may include classifying the lenses into one to three groups based on a refractive index of each of the lenses, and forming the coating layer based on a refractive index of a group of the one to three groups.

The forming of the coating layer based on a refractive index of a group of the one to three groups may include forming the coating layer having a refractive index that is ±10% of the refractive index of the group.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
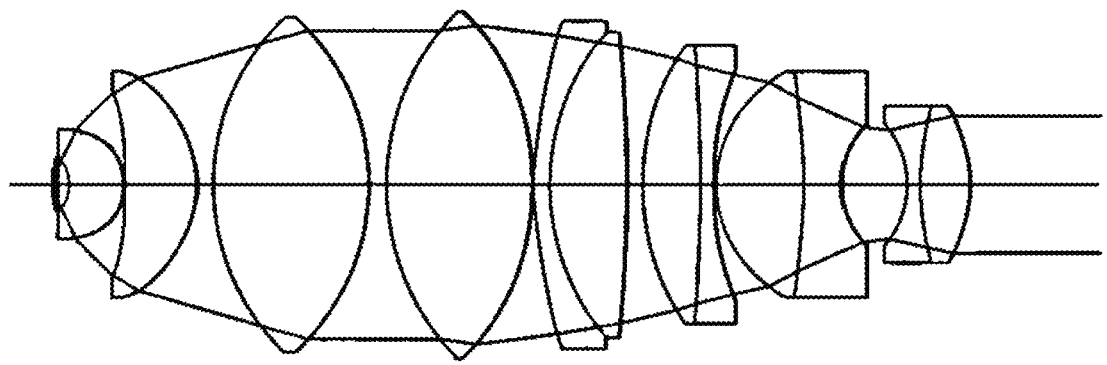
FIG. 1 is a diagram illustrating an example of a configuration of a broadband objective lens including a plurality of lenses according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art and are not to be interpreted in an idealized or overly formal sense unless expressly so defined herein.

Also, in the description of embodiments, detailed description of well-known related structures or functions will be omitted when it is deemed that such description will cause ambiguous interpretation of the present disclosure.

Hereinafter, a broadband objective lens including an anti-reflective nanopattern and a method of manufacturing the broadband objective lens will be described in detail with reference to example embodiments and accompanying drawings. However, examples are not limited to those described herein and to those described with reference to the drawings. Regarding the reference numerals assigned to the elements in the drawings, it should be noted that the same elements will be designated by the same reference numerals, wherever possible, even though they are shown in different drawings.

FIG. 1 is a diagram illustrating an example of a configuration of a broadband objective lens including a plurality of lenses according to an example embodiment.

Referring to FIG. 1, an objective lens includes a combination of multiple lenses having different materials from one another. However, not all manufacturers of the lenses open information on lens materials, and thus it may not be easy to optimize a processing condition for each of the lenses and different processing conditions may be needed for the respective lenses. In addition, optical glass used for lens may include an element and/or a compound that does not produce a response at an etching chamber to form a volatile fluoride compound, and it may thus be more difficult to perform etching based on a plasma process than fused silica and glass, for example, Pyrex. Such an etching process for optical glass may be more similar to a mechanical sputtering process and require a high bias voltage for the etching. Thus, such an aggressive process may degrade an etching mask, thereby degrading a process selectivity.

Thus, there may need a method of optimizing a processing condition for each of the lenses used for the objective lens.

Figure 2:
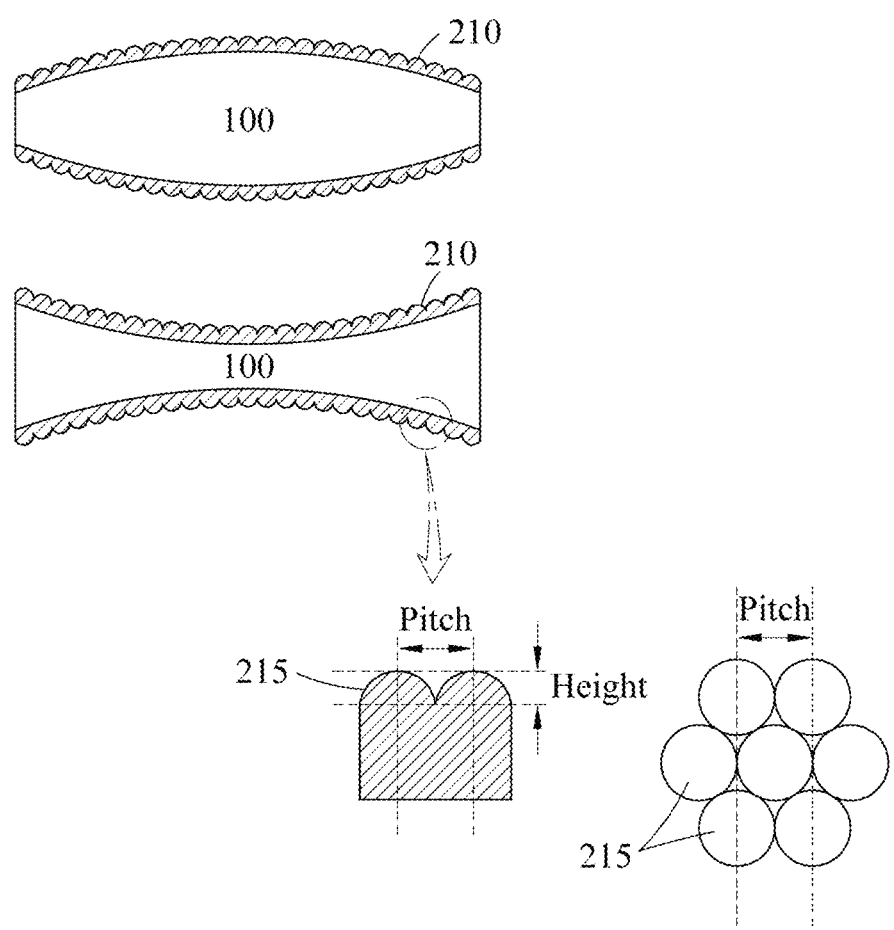
FIG. 2 is a diagram illustrating an example of a typical type of lens included in a broadband objective lens according to an example embodiment.

FIG. 2 is a diagram illustrating an example of a typical type of lens included in a broadband objective lens according to an example embodiment.

Referring to FIG. 2, a broadband objective lens includes a plurality of lenses 100 each including a coating layer 210 on which a nanopattern 215 is formed.

The broadband objective lens is embodied by a combination of the lenses 100 having different materials. By coating a surface of each of the lenses 100 with the coating layer 210 on which the nanopattern 215 is formed, each of the lenses 100 may have a transmittance of 90% or greater.

Thus, the broadband objective lens including the lenses 100 may enable high-resolution and high-sensitivity imaging in a broad wavelength band.

According to an example embodiment, such a coating layer may be an anti-reflective coating layer. The coating layer on which a nanopattern is formed may be coated on a surface of each of lenses to prevent reflection and improve a transmittance of the lenses.

The nanopattern may include an arrangement in which at least one of cylinder, triangular pyramid, or parabolic cylinder is repeated.

Each of a height and a pitch of the nanopattern may be 100 nanometers (nm) to 600 nm.

The nanopattern may include a honeycomb structure.

As illustrated in FIG. 2, the coating layer 210 on which the nanopattern 215 is formed is coated on a surface of each of the lenses 100, for example, concave and convex lenses, which are included in the broadband objective lens.

The nanopattern 215 may be desirably formed in a parabolic cylindrical shape as illustrated in FIG. 2. However, a shape of the nanopattern 215 is not limited to the illustrated parabolic cylindrical shape, and thus any pattern shapes that may generate an anti-reflective effect may also be used.

The height and the pitch of the nanopattern 215 may be 100 nm to 600 nm, respectively. For example, when the pitch of the nanopattern 215 is less than 100 nm, a pattern forming process may become more challenging. In contrast, when the pitch of the nanopattern 215 is greater than 600 nm, a reflectance may increase due to generation of a high-order diffraction mode.

When the height of the nanopattern 215 is less than 100 nm, a change in refractive index may become rapid due to an effective medium theory, and thus a desirable reduction in reflectance may not be expected. In contrast, when the height of the nanopattern 215 is greater than 600 nm, a pattern forming process may become more challenging.

In addition, to improve the anti-reflective effect, the nanopattern 215, for example, each parabolic cylindrical nanopattern as illustrated in FIG. 2, may be desirably formed in a honeycomb structure without a gap between parabolic cylinders. However, any pattern shape that may fill a surface of lenses without a gap may also be used without restriction.

According to an example embodiment, such a coating layer may include at least one selected from a group consisting of silicon oxide, titanium oxide, aluminium oxide, tantalum oxide, silicon nitride, and magnesium fluoride.

The coating layer may have a refractive index of 1.4 to 1.9.

The coating layer may have a refractive index that is ±10% of a refractive index of each of lenses.

It may be desirable, on process, that a coating layer to be coated on each of lenses is formed of one material or substance. However, when a difference in terms of refractive index between each of the lenses and the coating layer is 10% or greater, an anti-reflective coating effect may not be generated. Thus, it may be desirable to classify the lenses into one to three groups based on a refractive index of each of the lenses and select a material to be used as the coating layer based on a refractive index of a group of the one to three groups.

According to an example embodiment, the broadband objective lens may have an average transmittance of 70% or greater in a wavelength range of 450 nm to 1600 nm, an average transmittance of 80% or greater in a wavelength range of 450 nm to 1000 nm, and an average transmittance of 60% or greater in a wavelength range of 1000 nm to 1600 nm.

An existing objective lens including a plurality of lenses may have a transmittance that decreases rapidly in a wavelength range greater than a wavelength of 1000 nm and may thus not be used as a multimodal optical microscope. To improve this decreasing transmittance, the objective lens may need super-multilayer thin films which require a great amount of processing time and costs.

However, according to an example embodiment, by coating each of multiple lenses with a coating layer having a nanopattern, each of the lenses may have a transmittance of 90% or greater, and an objective lens including these lenses may have an average transmittance of 70% or greater in a wavelength range of 450 nm to 1600 nm, an average transmittance of 80% or greater in a wavelength range of 450 nm to 1000 nm, and an average transmittance of 60% or greater in a wavelength range of 1000 nm to 1600 nm. Thus, simply by coating each lens with a coating layer on which a nanopattern formed with one to three materials is formed, it is possible to implement a broadband objective lens to be used for a multimodal optical microscope.

Figure 3:
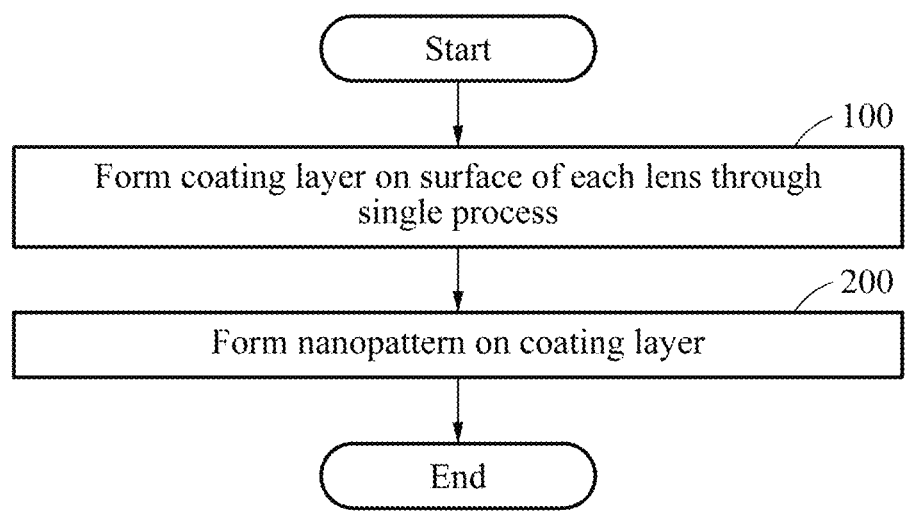
FIG. 3 is a flowchart illustrating an example of a method of manufacturing a broadband objective lens according to an example embodiment.

FIG. 3 is a flowchart illustrating an example of a method of manufacturing a broadband objective lens according to an example embodiment.

Referring to FIG. 3, a method of manufacturing a broadband objective lens includes operation 100 of forming a coating layer on a surface of each of multiple lenses through a single process, and operation 200 of forming a nanopattern on the coating layer.

Figure 4:
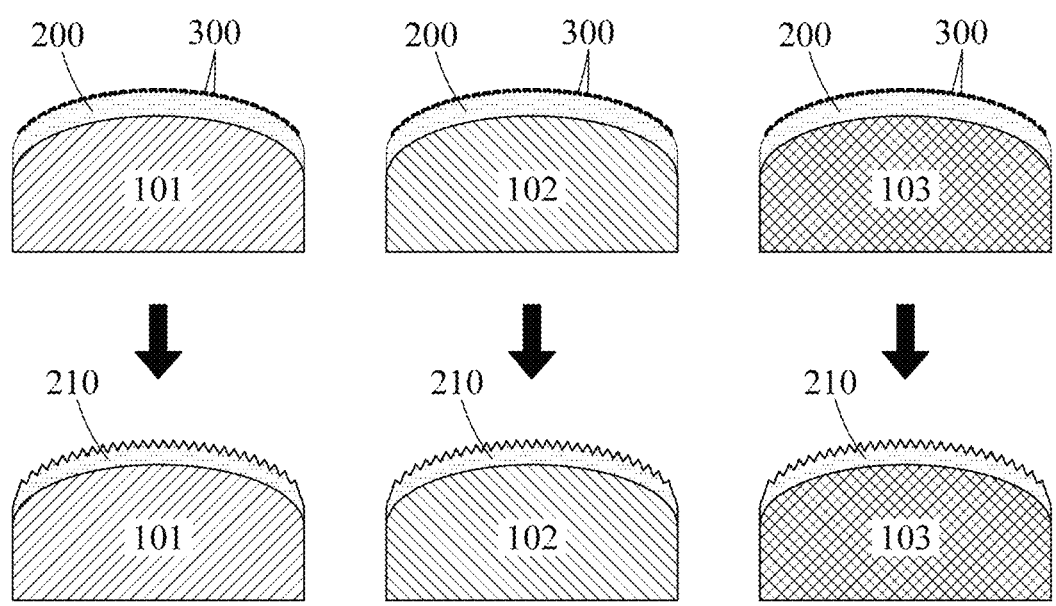
FIG. 4 is a diagram illustrating an example of a method of manufacturing a broadband objective lens according to an example embodiment.
Figure 5:
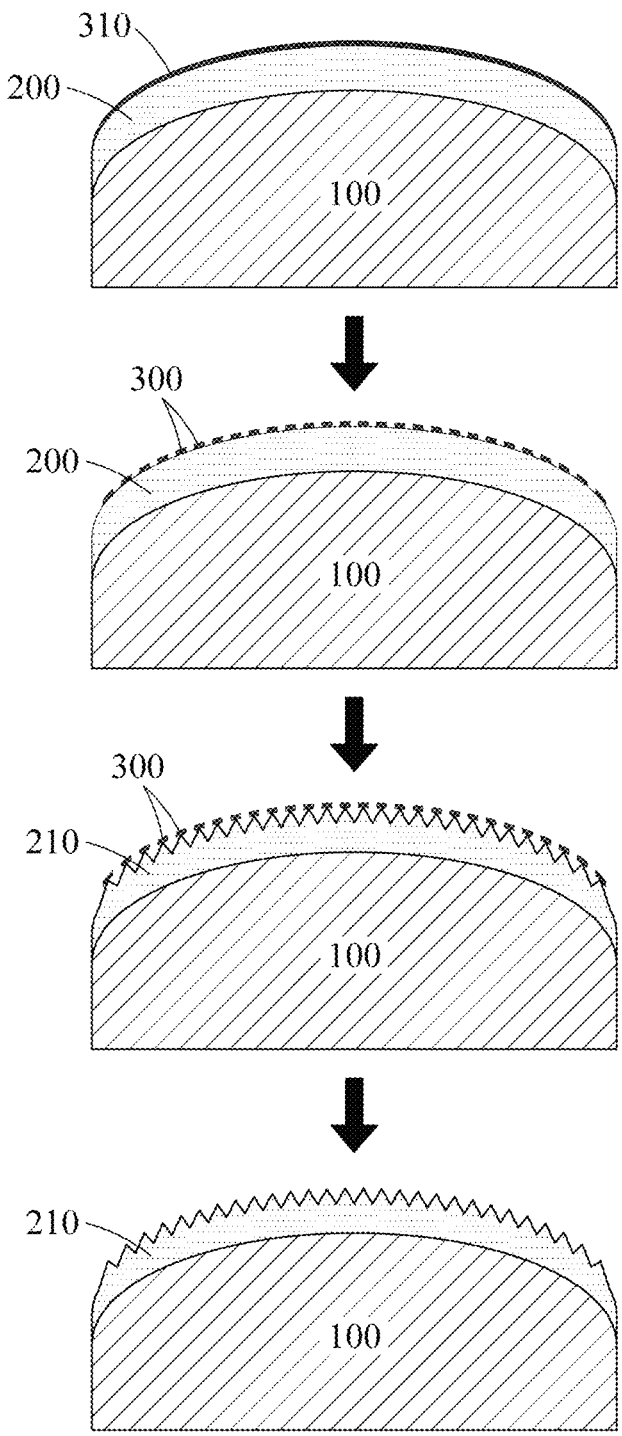
FIG. 5 is a diagram illustrating an example of a method of manufacturing a broadband objective lens according to an example embodiment.

FIGS. 4 and 5 are diagrams illustrating an example of a method of manufacturing a broadband objective lens according to an example embodiment.

Referring to FIG. 4, in operation 200 described above with reference to FIG. 3, a coating layer 200 is formed on a surface of each of multiple lenses 100, 101, 102, and 103 through a single process. Thus, the lenses 100, 101, 102, and 103 on which the coating layer 200 is formed are manufactured.

According to an example embodiment, such an operation of forming a coating layer may include classifying a plurality of lenses into one to three groups based on a refractive index of the lenses, and forming a coating layer based on a refractive index of a group of the one to three groups.

The forming of a coating layer based on a refractive index of a group of the one to three groups may include forming a coating layer having a refractive index that is ±10% of the refractive index of the group.

For example, the forming of a coating layer may include selecting one or three types of material or substance to be used for the coating layer based on a refractive index of a group of the classified one to three groups, preparing a solution including the one to three types of material, and immersing lenses of the one to three groups, respectively, to form the coating layer on each of the lenses. That is, through the single process, it is possible to form the coating layer on respective surfaces of the lenses formed with different materials.

As described above, it may be desirable, on process, that respective coating layers to be coated on multiple lenses are formed with a single material. However, when a difference in terms of refractive index between the coating layers and the lenses is greater than or equal to 10%, an anti-reflective coating effect may not be generated. Thus, it may be desirable to classify the lenses into one to three groups based on refractive indices of the lenses, and then select a material to be used for a coating layer based on a refractive index of a group of the one to three groups.

According to an example embodiment, an operation of forming a nanopattern on the coating layer may include forming a nanoparticle on the coating layer, etching the coating layer on which the nanoparticle is formed, and removing the nanoparticle formed on the coating layer. Herein, a size of the nanoparticle may be 30 nm to 300 nm.

For example, referring to FIG. 5, a metal layer 310 is formed on a coating layer 200 to be coated on a lens 100 and then annealed, a metal nanoparticle 300 is formed. A portion in which the nanoparticle 300 is not formed is etched, and then a coating layer 210 on which a nanopattern is formed is formed.

That is, a size of the nanopattern may be determined based on a size of the nanoparticle 300. For example, when the size of the nanoparticle 300 is less than 30 nm or greater than 300 nm, a pitch of the nanopattern formed by using particles as a mask may become extremely small or large, and it may not be easy to form a desirable pitch of the nanopattern to satisfy an anti-reflective condition.

Hereinafter, more detailed description will be provided with reference to examples and comparative examples.

However, the following examples are provided merely for illustrative purpose, and thus examples are not limited to these.

Examples

A coating layer was formed, using a coating material, on lenses SNBH8, SLAM2, SNBM51, SFPL51, NKZFS2, SPHM52, SFPL53, and SLAH58, and a nanopattern was formed on the coating layer through an etching process. The lenses SNBH8, SLAM2, SNBM51, SFPL51, NKZFS2, SPHM52, SFPL53 including the respective coating layers on which the nanopattern is formed are used as examples 1, 2, 3, 4, 5, 6, 7, and 8, respectively.

In addition, an objective lens was manufactured using these lenses used as examples 1 to 8, and the objective lens is used as example 9.

Table 1 indicates the lenses used and their refractive indices.

TABLE 1

|  | Lens (product) | Refractive index |
| --- | --- | --- |
| Example 1 | SNBH8 | 1.71437 |
| Example 2 | SLAM2 | 1.73905 |
| Example 3 | SNBM51 | 1.60925 |
| Example 4 | SFPL51 | 1.49514 |
| Example 5 | NKZFS2 | 1.5552 |
| Example 6 | SPHM52 | 1.61504 |
| Example 7 | SFPL53 | 1.43733 |
| Example 8 | SLAH58 | 1.87656 |

Referring to Table 1 above, the refractive indices of the lenses are different, and the lenses were classified into three groups based on the refractive indices, for example, a group of lenses with a refractive index of 1.8 or greater, a group of lenses with a refractive index of 1.6 or greater to 1.8 or less, and a group of lenses with a refractive index of 1.6 or less. Based on the classified groups, coating was performed using a material with a similar refractive index.

Comparative Examples

A coating layer was not formed on the lenses SNBH8, SLAM2, SNBM51, SFPL51, NKZFS2, SPHM52, SFPL53, and SLAH58 used as examples 1 to 8, and their transmittances without the coating layer were calculated. The lenses SNBH8, SLAM2, SNBM51, SFPL51, NKZFS2, SPHM52, SFPL53, and SLAH58 without the coating layer are used as comparative examples 1, 2, 3, 4, 5, 6, 7, and 8, respectively.

In addition, an objective lens was manufactured using theses lenses used as comparative examples 1 to 8, and the objective lens is used as comparative example 9.

Figure 6A:
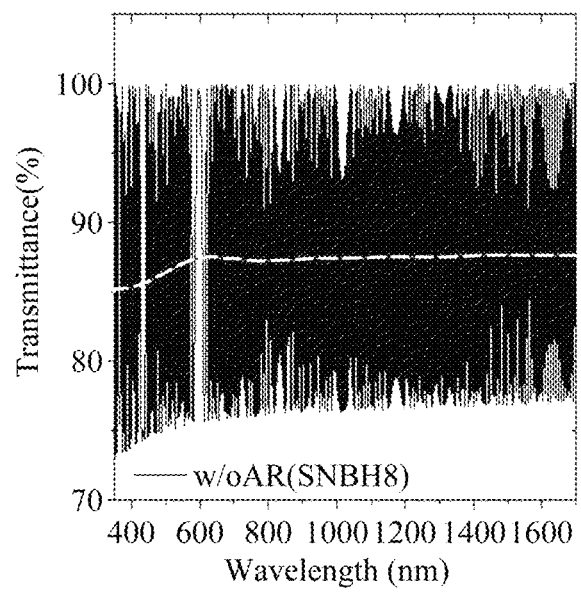
FIG. 6A is a graph illustrating a transmittance obtained from comparative example 1.

FIG. 6A is a graph illustrating a transmittance obtained from comparative example 1.

Figure 6B:
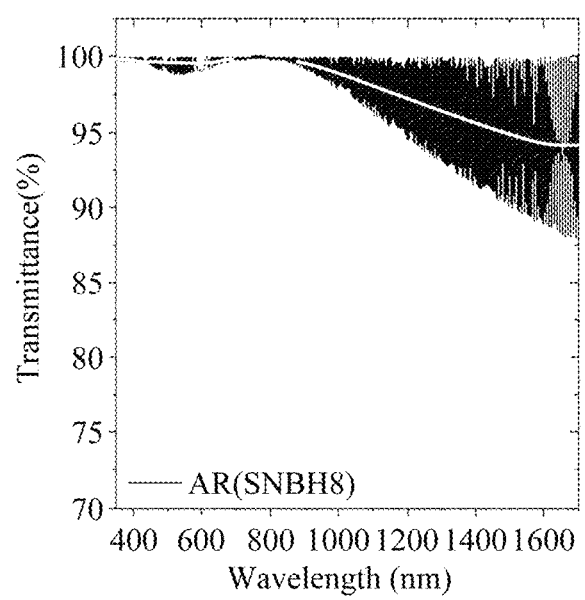
FIG. 6B is a graph illustrating a transmittance obtained from example 1.

FIG. 6B is a graph illustrating a transmittance obtained from example 1.

Figure 6C:
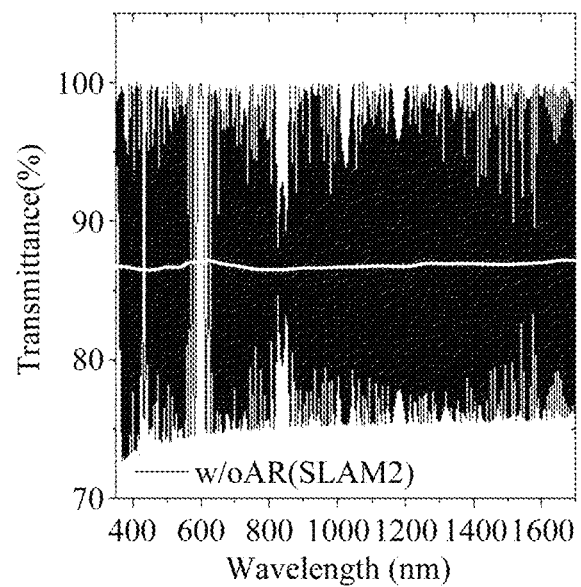
FIG. 6C is a graph illustrating a transmittance obtained from comparative example 2.

FIG. 6C is a graph illustrating a transmittance obtained from comparative example 2.

Figure 6D:
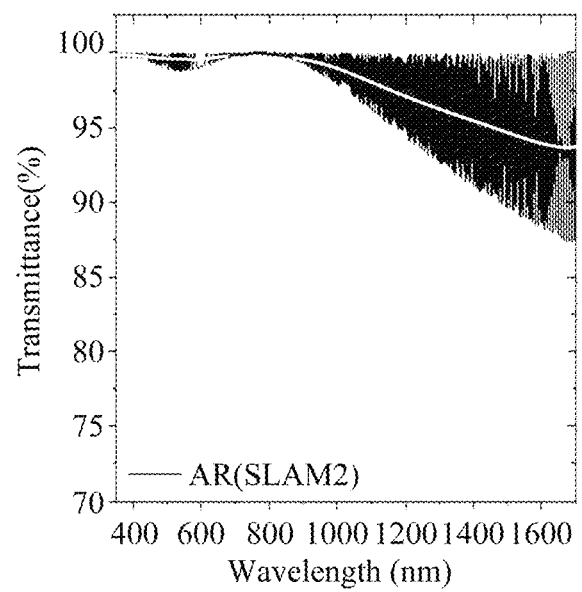
FIG. 6D is a graph illustrating a transmittance obtained from example 2.

FIG. 6D is a graph illustrating a transmittance obtained from example 2.

Figure 6E:
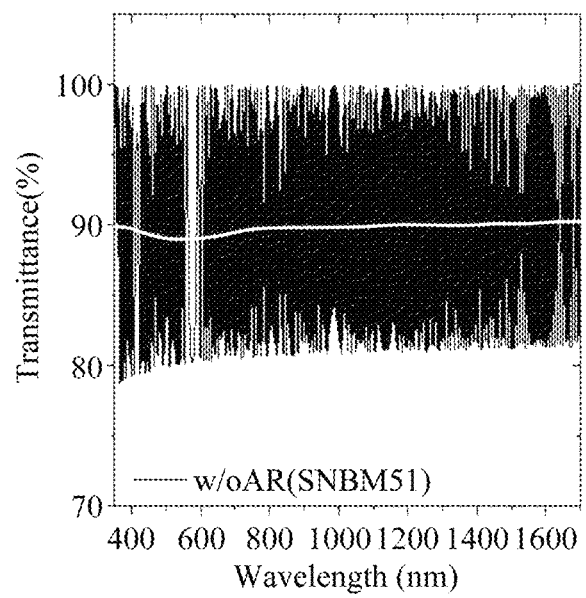
FIG. 6E is a graph illustrating a transmittance obtained from comparative example 3.

FIG. 6E is a graph illustrating a transmittance obtained from comparative example 3.

Figure 6F:
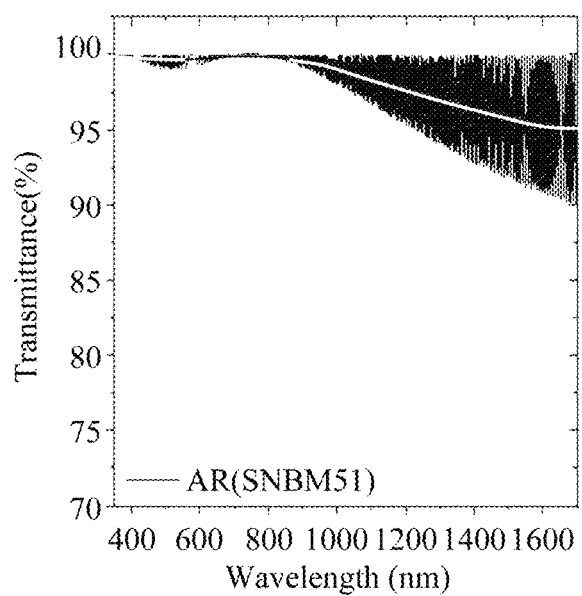
FIG. 6F is a graph illustrating a transmittance obtained from example 3.

FIG. 6F is a graph illustrating a transmittance obtained from example 3.

Figure 7A:
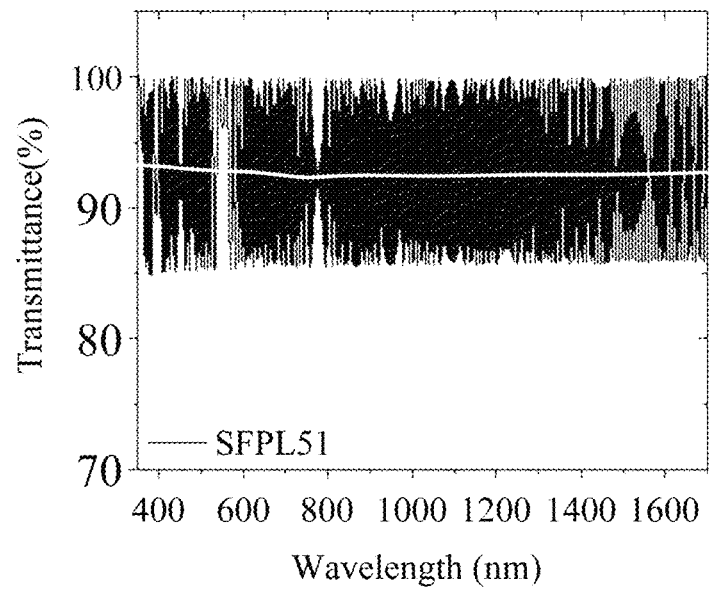
FIG. 7A is a graph illustrating a transmittance obtained from comparative example 4.

FIG. 7A is a graph illustrating a transmittance obtained from comparative example 4.

Figure 7B:
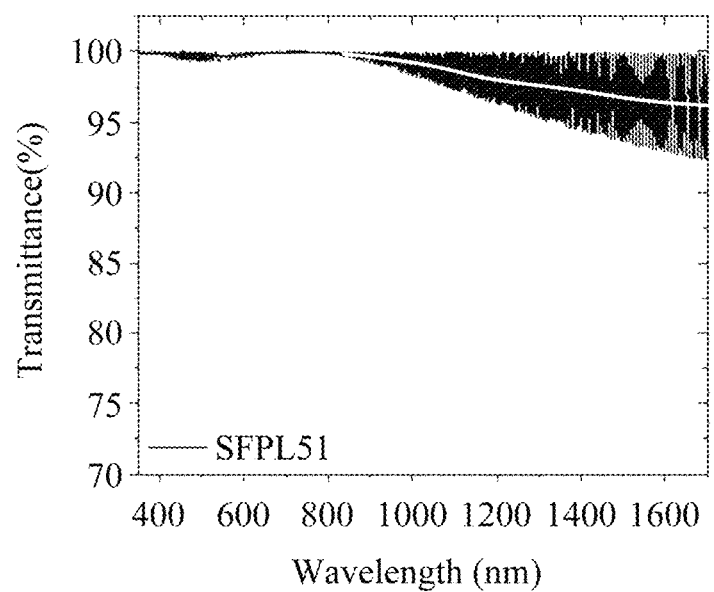
FIG. 7B is a graph illustrating a transmittance obtained from example 4.

FIG. 7B is a graph illustrating a transmittance obtained from example 4.

Figure 7C:
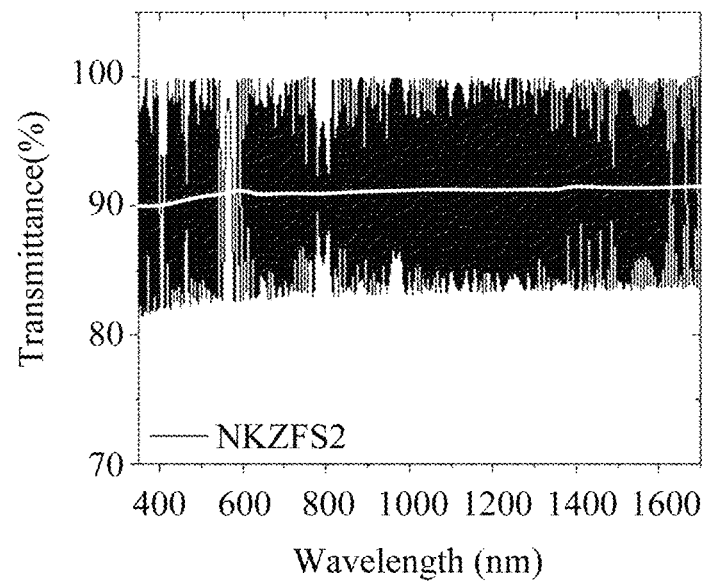
FIG. 7C is a graph illustrating a transmittance obtained from comparative example 5.

FIG. 7C is a graph illustrating a transmittance obtained from comparative example 5.

Figure 7D:
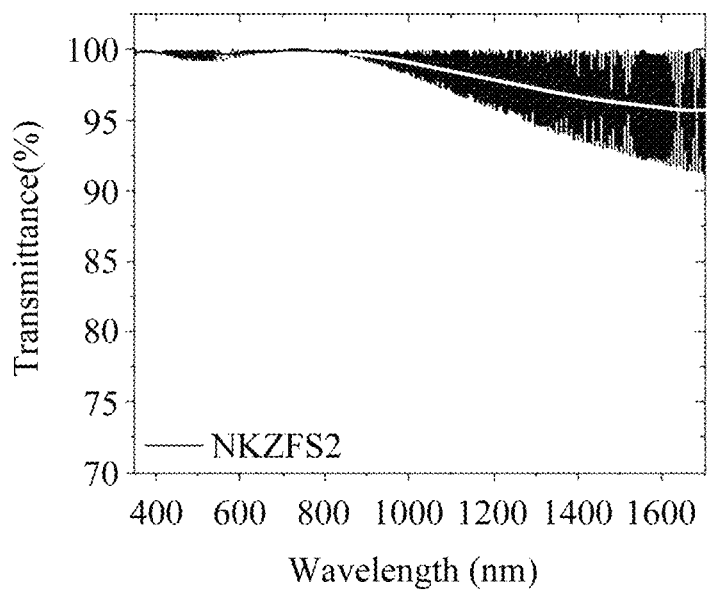
FIG. 7D is a graph illustrating a transmittance obtained from example 5.

FIG. 7D is a graph illustrating a transmittance obtained from example 5.

Figure 7E:
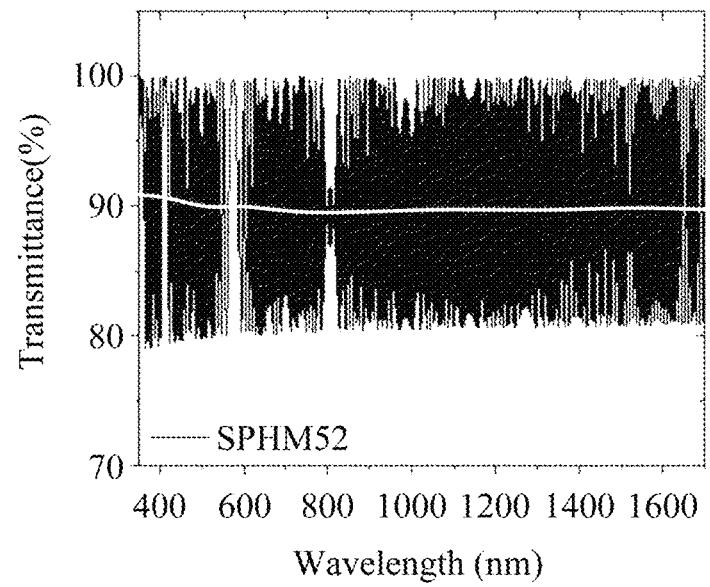
FIG. 7E is a graph illustrating a transmittance obtained from comparative example 6.

FIG. 7E is a graph illustrating a transmittance obtained from comparative example 6.

Figure 7F:
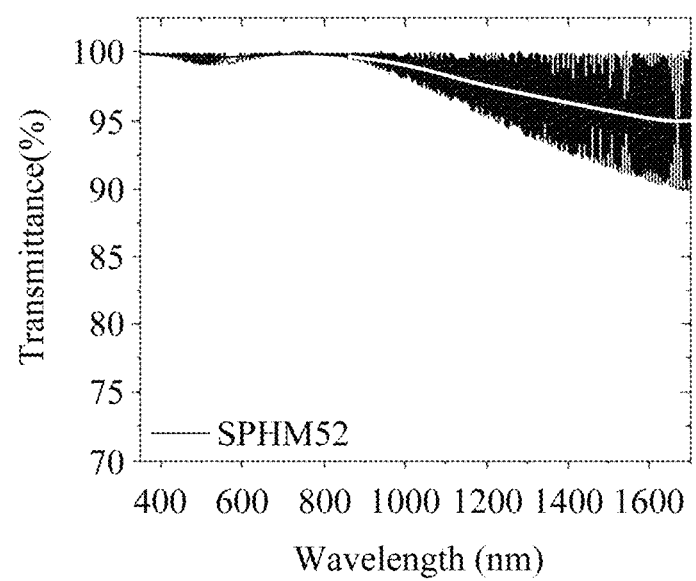
FIG. 7F is a graph illustrating a transmittance obtained from example 6.

FIG. 7F is a graph illustrating a transmittance obtained from example 6.

Figure 8A:
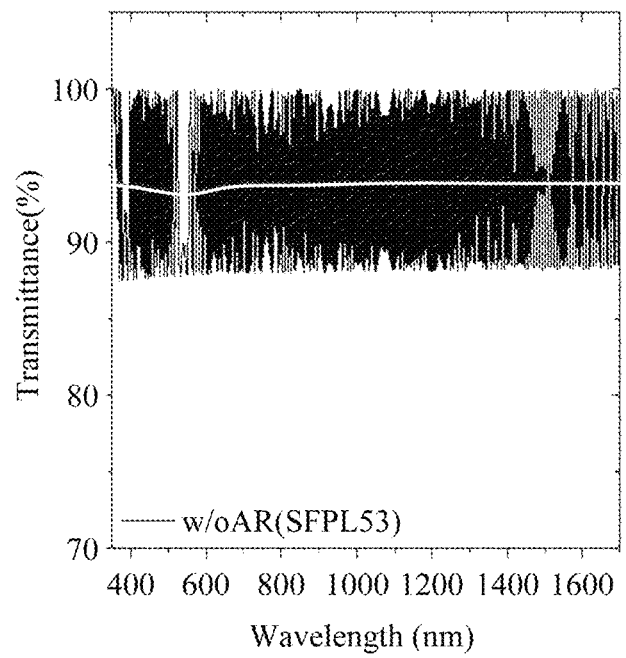
FIG. 8A is a graph illustrating a transmittance obtained from comparative example 7.

FIG. 8A is a graph illustrating a transmittance obtained from comparative example 7.

Figure 8B:
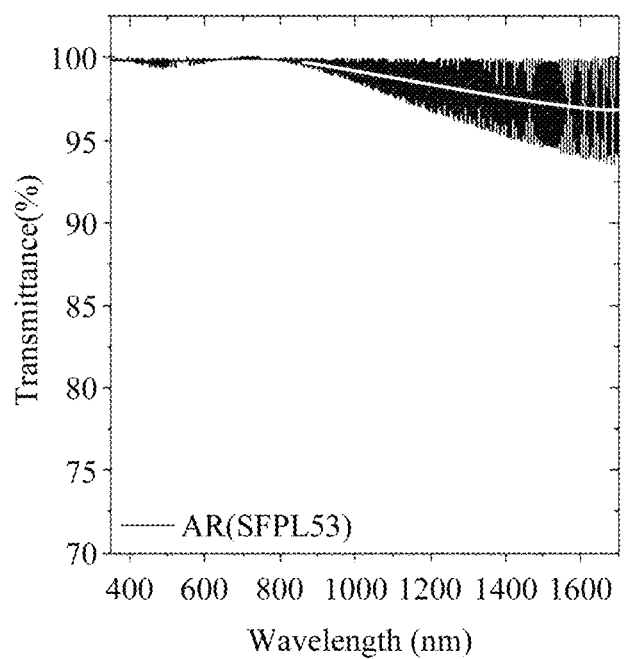
FIG. 8B is a graph illustrating a transmittance obtained from example 7.

FIG. 8B is a graph illustrating a transmittance obtained from example 7.

Figure 8C:
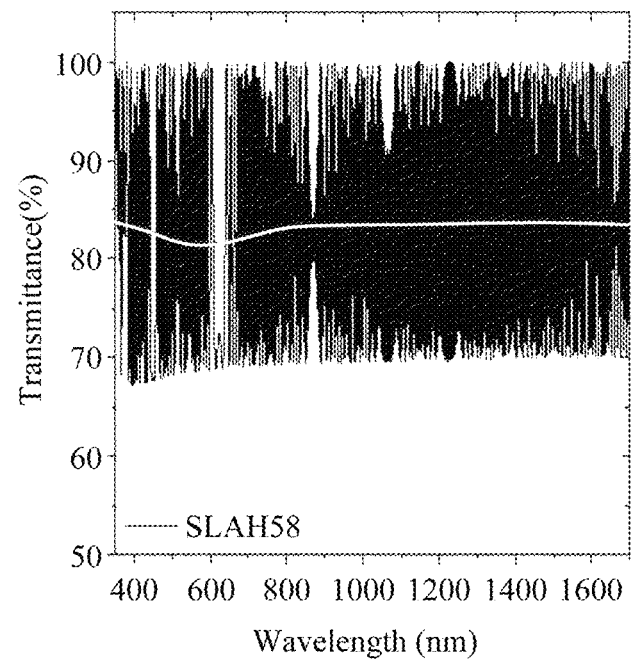
FIG. 8C is a graph illustrating a transmittance obtained from comparative example 8.

FIG. 8C is a graph illustrating a transmittance obtained from comparative example 8.

Figure 8D:
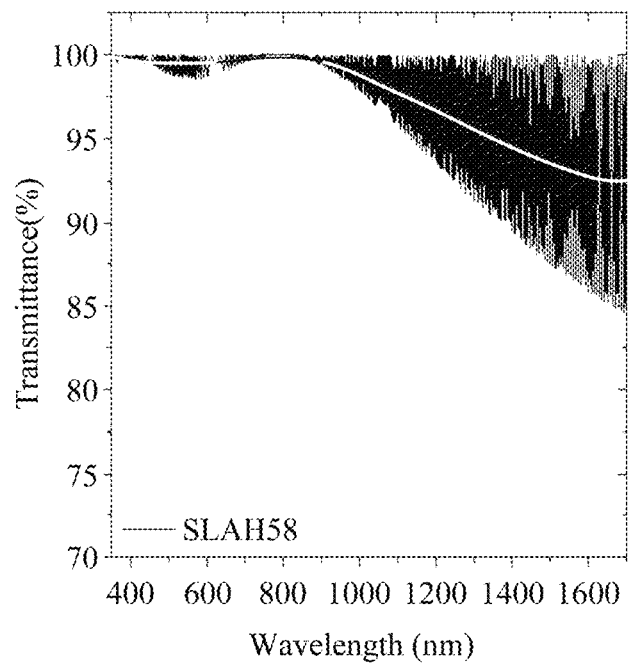
FIG. 8D is a graph illustrating a transmittance obtained from example 8.

FIG. 8D is a graph illustrating a transmittance obtained from example 8.

Table 2 indicates transmittances (%) obtained from comparative examples 1 to 8, and examples 1 to 8, in a wavelength region of 1560 nm.

TABLE 2

|  | Transmittance (%) |
|---|---|
| Comparative Example 1 | 87.7 |
| Example 1 | 94.5 |
| Comparative Example 2 | 87.0 |
| Example 2 | 94.2 |
| Comparative Example 3 | 90.2 |
| Example 3 | 95.4 |
| Comparative Example 4 | 92.6 |
| Example 4 | 96.5 |
| Comparative Example 5 | 91.4 |
| Example 5 | 96.0 |
| Comparative Example 6 | 89.8 |
| Example 6 | 95.3 |
| Comparative Example 7 | 93.9 |
| Example 7 | 97.0 |
| Comparative Example 8 | 83.6 |
| Example 8 | 93.0 |

Referring to FIGS. 6A through 6F, 7A through 7F, 8A through 8D, and Table 2 above, the lenses including a coating layer on which a nanopattern is formed, which are used as examples 1 to 8, respectively, may have transmittances that are considerably greater than those obtained from the lenses without such a coating layer, which are used as comparative examples 1 to 8, respectively, in all wavelength ranges. The lenses used as examples 1 to 8 may have an average transmittance greater than that of the lenses used as comparative examples 1 to 8, even in a wavelength range of 1000 nm or greater.

In addition, the lenses including the coating layer on which the nanopattern is formed, which are used as examples 1 to 8, may have transmittances of 90% or greater in wavelengths of 400 nm to 1600 nm.

Figure 9A:
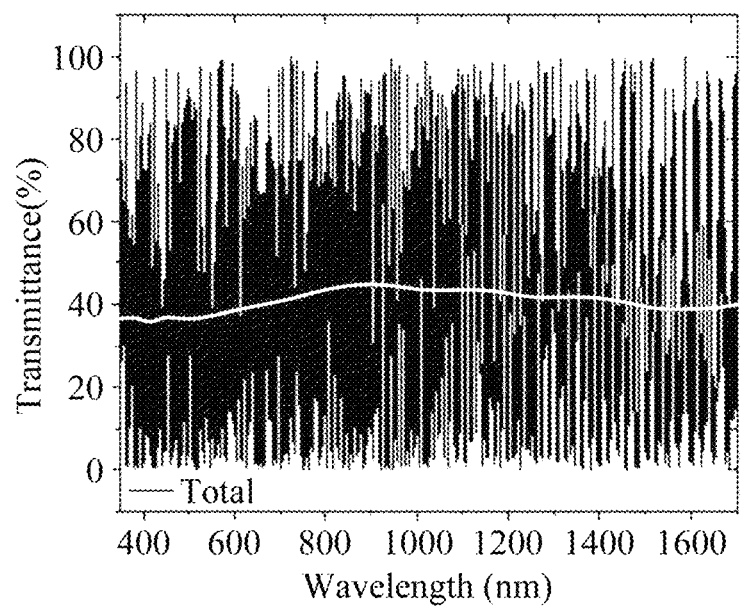
FIG. 9A is a graph illustrating a transmittance obtained from comparative example 9.

FIG. 9A is a graph illustrating a transmittance obtained from comparative example 9.

Figure 9B:
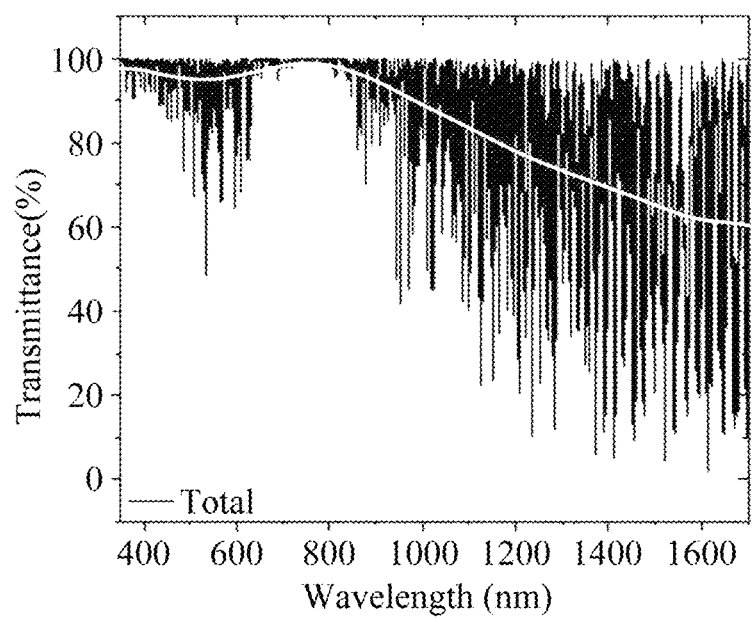
FIG. 9B is a graph illustrating a transmittance obtained from example 9.

FIG. 9B is a graph illustrating a transmittance obtained from example 9.

Table 3 indicates transmittances (%) obtained from comparative example 9 and example 9 in a wavelength region of 1560 nm.

TABLE 3

|  | Transmittance (%) |
|---|---|
| Comparative Example 9 | 38.7 |
| Example 9 | 63.1 |

Referring to FIGS. 9A and 9B, and Table 3 above, the objective lens used as example 9 may have an average transmittance of 70% or greater in a wavelength range of 450 nm to 1600 nm, an average transmittance of 80% or greater in a wavelength range of 450 nm to 1000 nm, and an average transmittance of 60% or greater in a wavelength range of 1000 nm to 1600 nm. In contrast, the objective lens used as comparative example 9 may have a relatively extremely low transmittance, for example, approximately 40%, in a wavelength range of 1000 nm or greater.

As described above, it is possible to embody a broadband objective lens to be used for a multimodal optical microscope simply by forming a coating layer on a surface of each of lenses formed with different materials through a single process and coating each of the lenses with the coating layer on which a nanopattern formed with one to three types of material is formed.

According to example embodiments described herein, by forming a broadband anti-reflective nanopattern on a surface of each of lenses included in an objective lens, all the lenses having different refractive indices may have a transmittance of 90% or greater.

According to example embodiments described herein, it is possible to reduce costs to be used for manufacturing a broadband objective lens by manufacturing an anti-reflective nanostructure through a same process for lenses of various materials included in the objective lens.

While this disclosure includes specific examples, it will be apparent to one of ordinary skill in the art that various changes in form and details may be made in these examples without departing from the spirit and scope of the claims and their equivalents.

The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A broadband objective lens comprising:
a plurality of lenses having an average transmittance of 70% or greater in a wavelength range of 450 nm to 1600 nm,
wherein at least two of the plurality of lenses comprise different materials, and
wherein each of the lenses includes a coating layer on which a nanopattern is formed,
wherein the coating layer to be coated on each of the lenses includes the same material,
wherein the nanopattern includes an arrangement in which at least one of a cylinder, triangular pyramid, or parabolic cylinder is repeated, and
wherein the nanopattern includes a honeycomb structure.

2. The broadband objective lens of claim 1, wherein the coating layer is an anti-reflective coating layer.

3. The broadband objective lens of claim 2, wherein each of a height and a pitch of the nanopattern is 100 nanometers (nm) to 600 nm.

4. The broadband objective lens of claim 1, wherein the coating layer includes at least one selected from a group consisting of silicon oxide, titanium oxide, aluminum oxide, tantalum oxide, silicon nitride, and magnesium fluoride.

5. The broadband objective lens of claim 1, wherein the coating layer has a refractive index of 1.4 to 1.9.

6. The broadband objective lens of claim 1, wherein the coating layer has a refractive index that is ±10% of a refractive index of each of the lenses.

7. The broadband objective lens of claim 1, having an average transmittance of 70% or greater in a wavelength range of 450 nm to 1600 nm,
having an average transmittance of 80% or greater in a wavelength range of 450 nm to 1000 nm, and
having an average transmittance of 60% or greater in a wavelength range of 1000 nm to 1600 nm.

* * * * *